United States Patent [19]

Pease et al.

[11] Patent Number: 4,907,117
[45] Date of Patent: Mar. 6, 1990

[54] INTEGRATED CIRCUIT THERMAL LIMIT

[75] Inventors: Robert A. Pease, San Francisco; Mansour Izadinia, Santa Clara; Jonathan Klein, Palo Alto, all of Calif.

[73] Assignee: National Semiconductor Corporation, Santa Clara, Calif.

[21] Appl. No.: 241,674

[22] Filed: Sep. 8, 1988

[51] Int. Cl.[4] .............................................. H02H 9/00
[52] U.S. Cl. ........................................ 361/54; 361/86; 361/103; 361/106; 340/484
[58] Field of Search ................... 361/25, 27, 54, 37, 361/86, 103, 106; 340/584, 587, 593, 594

[56] References Cited

U.S. PATENT DOCUMENTS 3,916,263 10/1975 Abbott ................................ 361/103
4,345,218 8/1982 Congdon et al. ............... 361/103 X
4,698,655 10/1987 Schultz ............................... 361/103

Primary Examiner—Todd E. DeBoer
Attorney, Agent, or Firm—Gail W. Woodward; Lee Patch; Michael A. Glenn

[57] ABSTRACT

An integrated circuit is disclosed having a thermal shutdown capability. A single chip bonding pad is coupled to a circuit that will operate the bonding pad at a low potential for normal conditions and will pull it high when a temperature threshold is crossed. Thus, the normally low bonding pad provides a temperature flag. The bonding pad is also coupled to a latch that will hold it high and to a lockout circuit that acts to disable the heat producing chip circuitry. Therefore, when the bonding pad is once driven high the circuits are locked out and will remain out until a start up command is present. This is achieved by either momentarily removing the power supply or by pulling the bonding pad low. Both manual and computer control of the circuit is disclosed.

6 Claims, 1 Drawing Sheet

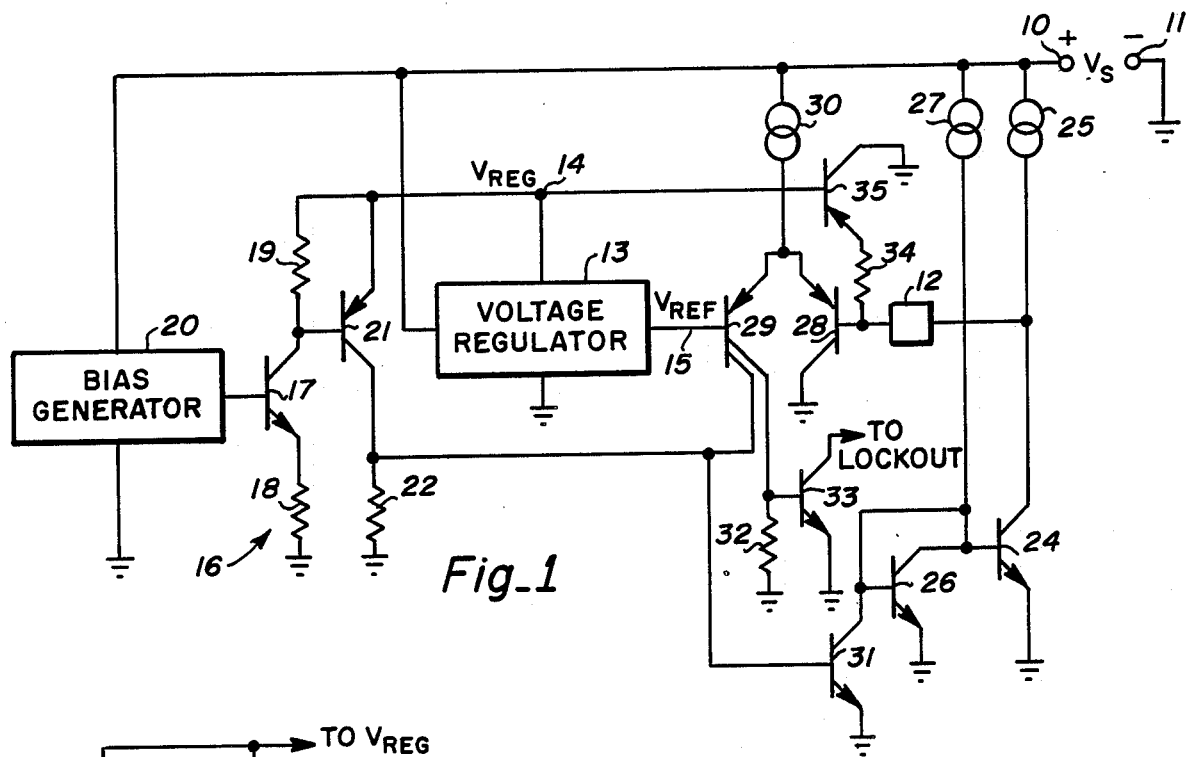
Fig_1
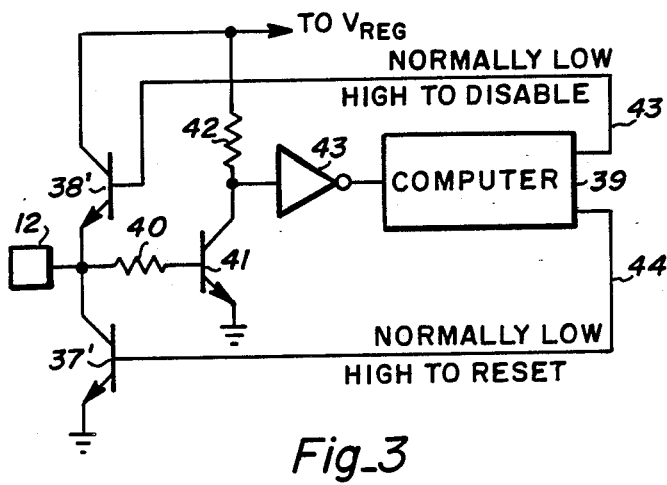
Fig_3
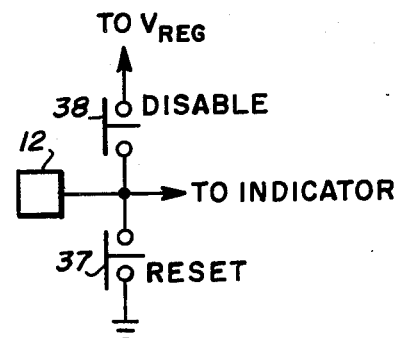
Fig_2

INTEGRATED CIRCUIT THERMAL LIMIT

BACKGROUND OF THE INVENTION

The invention relates to monolithic integrated circuit (IC) chips which are designed to shut down when their temperature exceeds a predetermined maximum. Typically, in the prior art, a chip temperature limit of about 160° C. is employed to activate a trip circuit, the output of which will turn off or lock out the chip operation. Thus, an overload will shut down the circuit which will then proceed to cool off. Upon sufficient cooling the circuit will again be energized and normal operation will occur. However, if the overload condition still exists the chip will again heat up and be shut down. Thus, thermal cycling will continue until the circuit power supply is removed or until the overload either is cleared or goes away on its own. In some applications such cycling can be detrimental. For example, in a motor control circuit application a thermal shutdown will stop motor action and a human operator might then reach into the machinery. An unexpected start up can then be disastrous. Accordingly, it is desirable under some conditions to include a latch function that will hold the IC chip inoperative until the circuit is deliberately reset. In this instance, a package pin is coupled to the thermal shutdown circuit to provide a flag that shows or indicates when a shutdown has occurred. Typically, another pin would be employed to provide an electrical reset for the shutdown function. It would be desirable to employ a single pin to provide both the indication and control of shutdown. Under this condition the same pin can be employed to "strap out" the thermal shutdown function.

In a copending patent application by Robert A. Pease, U.S. Ser. No. 236,110, filed 8-22-88, and titled LOW VOLTAGE LOCKOUT CIRCUIT, an IC is disclosed in which a portion of the chip heat-producing circuits can be locked out or their function terminated in response to low supply voltage. The teaching in this patent application is incorporated herein by reference.

SUMMARY OF THE INVENTION

It is an object of the invention to provide a temperature responsive lockout circuit that includes a latching function and must be reset to restore normal operation.

It is a further object of the invention to employ a single terminal pin to provide an indication of a high temperature condition, provide a lockout avoidance or reset connection and provide a lockout actuation connection.

It is a still further object of the invention to provide a terminal pin that can communicate with a computer which recognizes a high temperature condition, can control a lockout function to alleviate the overload, and can reset the circuit to continue normal operation.

These and other objects are achieved as follows. A single package pin is connected to an IC bonding pad which interconnects to the IC chip circuitry. The bonding pad is connected to a clamp circuit that limits the maximum positive potential to a predetermined level. The bonding pad is also connected to a differential amplifier input the other input of which is connected to a stable reference potential. The bonding pad is also connected to a control circuit that ordinarily pulls its potential low for normal circuit operation. The control circuit is operated from a temperature sensitive circuit that produces an output current when the chip temperature exceeds the design value. When the design temperature is exceeded the current produced by the temperature sensitive circuit actuates the control circuit which acts to pull the bonding pad high to its clamp value. This action switches the differential amplifier which produces an output that actuates a lockout circuit which terminates the operation of the heat-producing chip function. The differential amplifier has a second output that latches the control circuit so as to hold the bonding pad high. When it is desired to terminate the lockout function, the bonding pad can externally be pulled low which will defeat the latch and remove the lockout action. This resets the normal circuit operation. If desired, the bonding pad can be connected to a flag generator circuit and external lockout and reset circuits. These external or off-chip elements can communicate with a computer which can be programmed to recognize a flag which denotes a high chip temperature. The computer can then command a lockout which will alleviate the cause of the high temperature. It can further command normal circuit operation. From the above, it can be seen that a single bonding pad connection can act as a lockout flag, or as a lockout enable, lockout disable and reset.

BRIEF DESCRIPTION OF THE DRAWING

FIG. 1 is a schematic diagram of the integrated circuit chip elements of the invention.

FIG. 2 is a schematic diagram showing how the on-chip circuit of FIG. 1 communicates with external off-chip elements.

FIG. 3 is a schematic diagram of external circuits designed to communicate with a computer for the control of the circuit of FIG. 1.

DESCRIPTION OF THE INVENTION

The circuit of FIG. 1 is operated from a $V_S$ power supply connected + to terminal 10 and − to ground terminal 11. Bonding pad 12 is the single terminal used to operate the circuit in accordance with the invention. A voltage regulator 13, of convention well known construction, provides a $V_{REG}$ supply line 14 which is typically trimmed, by means not shown, to 5.00 volts. Regulator 13 includes a conventional reference voltage generator which provides a 1.25 volt reference on line 15. Both $V_{REG}$ and $V_{REF}$ are regulated and temperature invariant.

The heart of the circuit is temperature sensor 16 which operates as follows. Transistor 17 produces a current that flows in resistors 18 and 19. Bias generator 20 is desirably of the kind set forth in U.S. Pat. No. 3,930,172. The bias on the base of transistor 17 is independent of power supply potential and produces a current in transistor 17 that follows a well established repeatable temperature-current relationship. This current flowing in resistor 19 produces a voltage drop that is normally insufficient to turn transistor 21 on. The conduction threshold of transistor 21 will fall with rising temperature. Elements 17–21 inclusive are proportioned so that at about 160° C. (433° K.), current will start to flow in the collector of transistor 21 which is returned to ground by resistor 22. This current will rise with temperature.

The collector of transistor 24 is connected to bonding pad 12 and is returned to $V_S$ terminal 10 through current source 25. Transistor 26 is diode connected to the base of transistor 24 and is returned to $V_S$ terminal 10 through current source 27. Thus, transistors 24 and 26 form a current mirror which will have unity current gain if the transistors are matched. Under ordinary conditions current source 27 is made about nine times larger than current source 25. Therefore, transistor 24 will attempt to sink about nine times as much current as it is supplied. This means that transistor 24 is in saturation and will therefore pull bonding pad 12 down to a small fraction of a volt.

Transistors 28 and 29 are coupled together as a differential pair receiving a tail current from source 30. When bonding pad 12 is low, as described above, and the base of transistor 29 at +1.25 volts, virtually all of the current in source 30 will flow in transistor 28 to ground. None will flow in transistor 29. Thus, at ordinary temperatures no current will flow in resistor 22 and transistor 31, which is connected from the base of transistor 24 to ground, will be nonconductive. At the same time no current will flow in resistor 32 and transistor 33 will be nonconductive. Thus, there will be no lockout function and normal operation will continue.

When the chip temperature exceeds about 160° C. and current flows in transistor 21, at some temperature level, some of the current will flow into the base of transistor 31. If the Beta of transistor 31 is about 200 and one microampere of current flows into its base virtually all of the current in source 27 will flow into the collector of transistor 31. At this point, transistors 26 and 24 will turn off. Then source 25 will pull bonding pad 12 up until the current will flow into resistor 34 and transistor 35. If resistor 34 is about 2k ohms and source 25 produces 20 microamperes, bonding pad 12 will be clamped at about 5.64 volts at 300° K. This level is one $V_{BE}+$ the drop across resistor 34 above $V_{REG}$ line 14.

Since the base of transistor 29 is at 1.25 volts, the differential amplifier will switch and transistor 28 will be off. Thus, the current in source 30 will flow in transistor 29. This current is divided between the two collectors. The current in the lower collector will flow into the base of transistor 31 thereby latching it on. The current flowing in the upper collector will flow into the base of transistor 33 thereby turning it on. The action of transistor 33 is to lock out the operation of the main heat dissipating elements (not shown) on the chip. This action is described more fully in patent application Ser. No. 236,110, filed 8-22-88, as reference above. The lockout can be applied to digital control circuits associated with the circuit of the invention or it can be applied to other associated linear circuits that produce chip heat. Thus, the chip is disabled and will remain so due to the latching action even though the chip cools off and transistor 21 no longer conducts.

Since bonding pad 12 is high (over 5 volts) it can be used to sense the presence of lock out. In this action its potential acts as a flag. If it is desired to reset the circuit operation, $V_S$ can be removed momentarily and then reapplied. However, if desired, bonding pad 12 can be returned to ground or pulled low by external means. This action is shown in FIG. 2 which displays the external connections to bonding pad 12. As is shown, the bonding pad can be connected to an indicator that will manifest the shutdown flag. Pushbutton 37 represents a means for momentarily pulling the bonding pad 12 low for reset. Pushbutton 38 represents the means for pulling bonding pad high to invoke lock out upon command.

FIG. 3 is an elaboration of external means for the control of bonding pad 12. The heart of the control circuit is computer 39, which could be a microprocessor or microcontroller, operating in accordance with software. Transistors 37' and 38' respectively replace pushbuttons 37 and 38. Resistor 40 couples bonding pad 12 to the base of transistor 41. Thus, bonding pad 12 can rise only slightly over one $V_{BE}$ above ground. This action, while providing a high temperature flag, prevents lock out from being invoked automatically. Transistor 41 includes a resistor 42 in its collector so that it acts as an inverter. Thus, when the lockout is activated the rise in potential at bonding pad 12 turns on transistor 41 thereby producing a flag low at the collector. Inverter buffer 43 couples and inverts the flag to computer 39. Once an indication of high temperature is present, the computer can order shutdown by sending a high command to transistor 38' by way of line 43 which is normally low. Transistor 38' will then pull bonding pad 12 to within one $V_{SAT}$ of $V_{REF}$. Then, again in accordance with the programming of computer 39, the circuit can be energized or reset by sending a high on normally low line 44. This will turn transistor 37' on and pull bonding pad 12 low. In summary, FIG. 2 illustrates how manual control can be used to implement circuit operation and in FIG. 3 a human operator is replaced by a computer that provides the rational control decisions.

EXAMPLE

The circuit of FIG. 1 was implemented using standard monolithic, junction-isolated, silicon components. The NPN transistors were of vertical high Beta construction and the PNP transistors were of conventional lateral construction. The following component values were employed:

| COMPONENT | VALUE | UNITS |
| --- | --- | --- |
| Resistor 18 | 1.8 k | ohms |
| Resistor 19 | 8 k | ohms |
| Resistors 22 and 32 | 20 k | ohms |
| Current Source 25 | 20 | microamperes |
| Current Source 27 | 180 | microamperes |
| Current Source 30 | 200 | microamperes |
| Resistor 34 | 2 k | ohms |

The circuit operated over a supply voltage range of 7 to 40 volts. $V_{REG}$ on line 14 was trimmed to 5.00 volts and $V_{REF}$ on line 15 was 1.25 volts. The circuit functioned normally at 300° K. and bonding pad 12 was close to zero volts. As chip temperature increased it was noted that bonding pad 12 switched high at about 435° K. and transistor 33 became saturated. The circuit remained latched on until either the supply, $V_S$, was removed momentarily or bonding pad 12 was pulled low.

The invention has been described and a working example detailed. When a person skilled in the art reads the foregoing description, alternatives and equivalents, within the spirit and intent of the invention, will be apparent. Accordingly, it is intended that the scope of the invention be limited only by the claims that follow.

We claim:

1. An integrated circuit thermal shutdown circuit for responding to excessive chip temperature, said circuit comprising:

a chip bonding pad having a potential and operative to provide external off chip access;

a differential amplifier having one input connected to said bonding pad and the other input connected to a source of reference potential so that the output of said differential amplifier switches state when said bonding pad potential is raised from a low potential state above said reference potential value;

means coupled to said bonding pad for holding said pad potential low for normal operating conditions under which said chip temperature is not excessive;

means coupled to said bonding pad for pulling said pad potential high when said excessive chip temperature occurs;

means for latching said bonding pad potential high when said excessive chip temperature occurs; and means coupled to said output of said differential amplifier for locking out the operation of said chip when said bonding pad potential is high.

2. The circuit of claim 1 further comprising means connected to said bonding pad for clamping its maximum positive potential excursion to a predetermined value.

3. The circuit of claim 1 wherein said differential amplifier has two outputs, one of which operates said means for latching and the other of which actuates said means for locking out the operation of said chip.

4. The circuit of claim 1 further including means external to said integrated circuit for indicating the state of the potential on said bonding pad, means for pulling the potential on said bonding pad high to disable said chip and means for pulling the potential on said bonding pad low to reset the operation of said chip.

5. The circuit of claim 4 further including a computer for controlling said chip and wherein said means for indicating include a first transistor having its base coupled to said bonding pad by means of a suitable impedance whereby said bonding pad potential is clamped low and the conduction in said transistor is employed as a flag to inform said computer of the presence of an excessive chip temperature.

6. The circuit of claim 5 further including a second transistor connected to said bonding pad and controlled by said computer to raise the potential on said bonding pad when said computer determines that lockout conditions should be invoked and a third transistor connected to said bonding pad and controlled by said computer to lower the potential on said bonding pad when said computer determines that said chip operation should be reset.

* * * * *